United States Patent [19]

Heath et al.

[11] Patent Number: 4,590,618
[45] Date of Patent: May 20, 1986

[54] RECEIVER HAVING REFERENCE VOLTAGE STABILIZATION CIRCUITRY

[75] Inventors: Michael C. Heath; Leonard E. Nelson, both of Plantation, Fla.

[73] Assignee: Motorola, Inc., Schaumburg, Ill.

[21] Appl. No.: 589,270

[22] Filed: Mar. 13, 1984

[51] Int. Cl.⁴ .............................................. H04B 1/16
[52] U.S. Cl. ................................. 455/343; 455/338
[58] Field of Search ............... 455/38, 228, 338, 343; 340/825.44

[56] References Cited

U.S. PATENT DOCUMENTS

| | | |
|---|---|---|
| 3,164,773 | 1/1965 | Daniel . |
| 3,571,620 | 3/1971 | Hansen . |
| 3,748,584 | 7/1973 | Ribour et al. ................. 455/343 |
| 4,114,097 | 9/1978 | Kubo et al. . |
| 4,185,246 | 1/1980 | Schroeder . |
| 4,274,132 | 6/1981 | Melymeux-Berry . |
| 4,380,832 | 4/1983 | Nagata et al. . |
| 4,479,261 | 10/1984 | Oda et al. ..................... 455/343 |
| 4,481,675 | 11/1984 | Ichikana et al. .............. 455/343 |

Primary Examiner—Jin F. Ng
Attorney, Agent, or Firm—Martin J. McKinley; Joseph T. Downey; Edward M. Roney

[57] ABSTRACT

An RF receiver having a coupling capacitor connected between the back end of the receiver and the input to a data limiter circuit, a battery saver strobe feature which periodically turns the receiver ON and OFF and a precharge circuit for precharging the coupling capacitor. The receiver further includes a reference voltage stabilization circuit which prevents a received signal from reaching the output of the back end of the receiver during the precharging of the coupling capacitor in order to minimize the voltage offsets from the desired unmodulated carrier frequency reference voltage which results in erroneous data being decoded by the decoder portion of the RF receiver.

5 Claims, 6 Drawing Figures

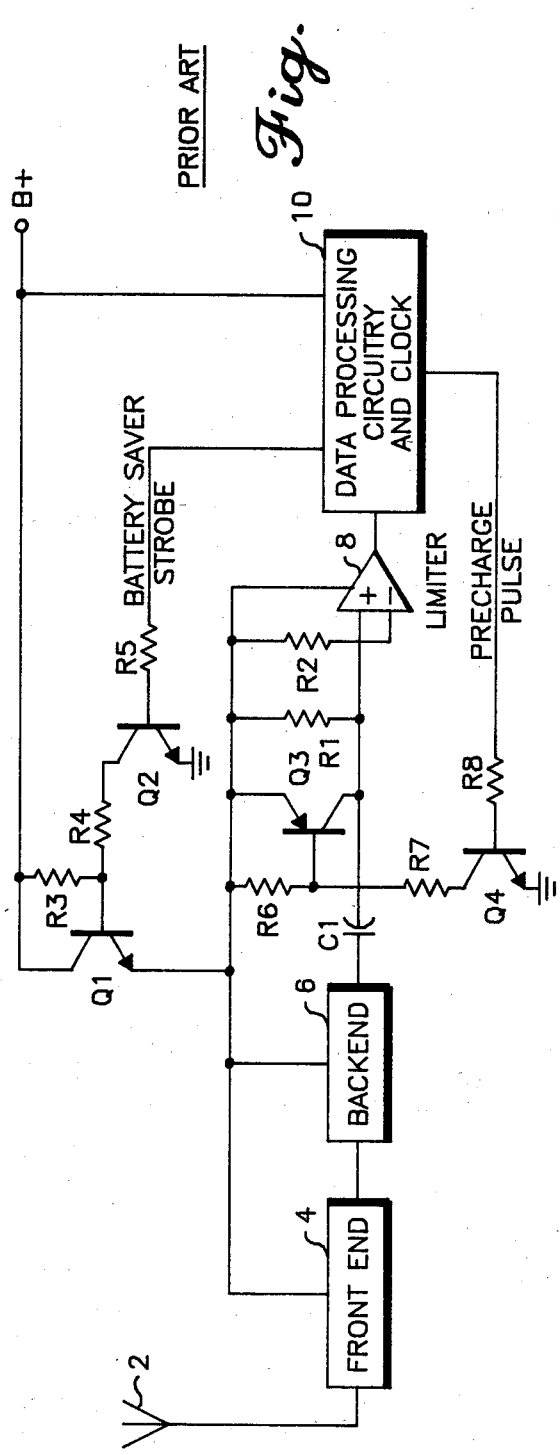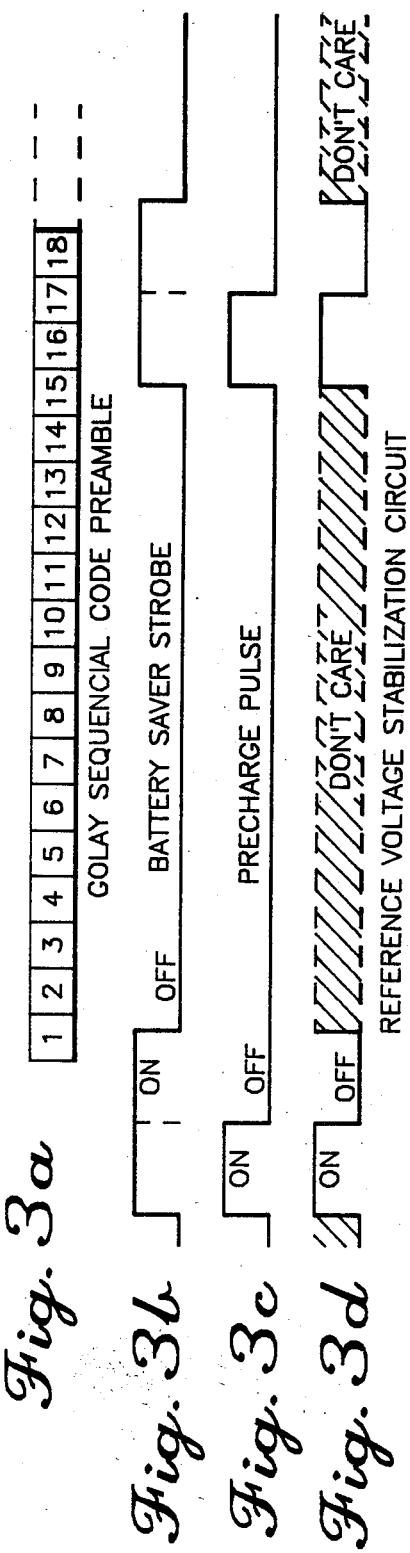

RECEIVER HAVING REFERENCE VOLTAGE STABILIZATION CIRCUITRY

BACKGROUND OF THE INVENTION

The present invention relates to an RF receiver for receiving digital data and more particularly to voltage reference stabilization circuitry therefor.

2. Description of the Prior Art

A block diagram of a prior art FM receiver is illustrated in FIG. 1. The receiver comprises the antenna 2 which receives an RF signal and transmits it to the front end 4 where the RF signals are amplified and converted into a first intermediate frequency (IF) signal by an RF amplifier and first mixer, respectively. The output of the front end 4 is directed to the back end 6 where the first IF signal is converted by a second mixer to a second IF signal. The second IF signal is amplified, limited, filtered and demodulated to produce an audio output signal that represents the coded binary data. The output of the back end 6 is capacitively coupled to a data limiter 8 via the capacitor C1. The capacitor C1 compensates for variations in the voltage differential between the output of the back end 6 and the limiter 8 input from unit to unit that result from component variations, tuning of the FM demodulator, and manufacturing processes. In addition, the capacitor C1 provides for a level shift between the output of the back end 6 and the limiter 8 input. The data limiter 8 converts the low amplitude audio signal from the back end 6 to logic level decision functions. The resistors R1 and R2 are used to bias the data limiter 8. The output of the data limiter 8 is directed to additional data processing circuitry and clock 10 for further desired processing. The FM receiver also includes a first switching means comprised of the transistor Q1, bias resistors R3 and R4, first driving transistor Q2 and base resistor R5. The transistor Q1 is connected between the various components of the FM receiver and the power supply and is periodically turned on and off by the driving transistor Q2 to provide a battery saving feature. The base of the first driving transistor Q2 is connected through a resistor R5 to the data processing circuitry and clock 10 which strobes the first driving transistor Q2 on and off in accordance with the timing chart shown in FIG. 3B. This battery saving technique is well known to those skilled in the art. A second switching means is comprised of transistors Q3 and Q4, bias resistor R6, load resistor R7 and bias resistor R8 and is used to precharge the coupling capacitor C1. The transistor Q3 is turned ON and OFF by the driving transistor Q4 and provides a low impedance path to charge the coupling capacitor C1 during the precharge pulse ON time, in accordance with the timing chart shown in FIG. 3C. The base of the second driving transistor Q4 is connected through the resistor R8 to the data processing circuitry and clock 10 which strobes the second driving transistor Q4 ON and OFF. The strobe signals for driving transistor Q2 and Q4 are normally derived from a fixed reference clock which is part of the data processing circuitry and clock 10. The data processing circuitry and clock 10, or portion thereof, is normally kept active during the periodic switching on and off of the various components of the FM receiver.

Normally in situations where it is necessary to pass digital data from the back end 6 to the data limiter 8, C1 will be a relatively large value. Thus, a long time in comparison with the ON and OFF switching of the battery voltage is required to charge the capacitor C1, especially when it is connected to a high impedance such as the bias resistors R1 and R2 for the data limiter 8. The second switching means is used to alleviate this situation by providing a momentary low impedance charge path immediately upon receipt of power from the battery, that is when the first switching means is turned ON. Thus, data decoding of the received bit stream can begin upon turning OFF of the second switching means and continue until the battery voltage is again interrupted by the first switching means.

However, one problem still exists even when the coupling capacitor C1 is precharged. During the precharge cycle, the receiver circuit is activated and data is present at the output of the back end 6. Thus, the voltage at the output of the back end 6 is dependent upon the data pattern being received. However, it is desirable to precharge the capacitor C1 to the difference between the voltage at the limiter input and an output reference voltage from the back end 6 that is centered between the "1" and "0" voltage levels associated with binary data reception. This reference voltage should equal the voltage at the output of the back end 6 when unmodulated carrier is received. When the output of the back end 6 is not at the unmodulated carrier reference voltage, that is when a long string of ones (or zeros) is received immediately before the turning OFF of the second switching means, the DC voltage across C1 is decreased if a large number of ones are received (or increased if a large number of zeros are received). Thus, relatively substantial DC voltage offsets from the desired unmodulated carrier reference voltage still occur. This will result in erroneous outputs from the data limiter 8 and ultimately result in the end user receiving no message or an erroneous message which differs from the originally transmitted message.

SUMMARY OF THE INVENTION

Accordingly, one object of the present invention is to provide a novel RF receiver in which the voltage across the coupling capacitor connected between the output of the back end of the RF receiver and the input of the data limiter is set equal to the difference between the voltage at the input of the data limiter and the voltage of the output of the backend that would be established during the reception of an unmodulated carrier frequency signal.

Another object of the present invention is to provide a novel RF receiver having a reference voltage stabilization circuit which presents a received signal from influencing the voltage across the coupling capacitor connected between the output of the back end of the RF receiver and the input of the data limiter during charging of the coupling capacitor, in order to prevent the occurrence of a reference voltage that is offset from the desired unmodulated carrier reference voltage which will result in erroneous data information being decoded by the receiver.

The above and other objects and advantages of the present invention are provided in the preferred embodiment by an RF receiver having a reference voltage stabilization circuit connected between the front end of the RF receiver and the back end of the RF receiver, the reference voltage stabilization circuit being activated during the time the coupling receivor connected between the back end of the RF receiver and the data limiter is being precharged. Activation of the reference voltage stabilization circuit during this time period prevents the reception of any transmitted signals, which allows the RF receiver to DC stabilize until decoding of data begins. When decoding begins, the reference voltage stabilization circuit is turned OFF to allow the received signals to pass through to the demodulator.

BRIEF DESCRIPTION OF THE DRAWINGS

A more complete appreciation of the invention and many of the afttendant advantages thereof will be readily apparent as the same becomes better understood by reference to the following detailed description when considered in connection with the accompanying drawings, wherein:

FIG. 1 is a circuit diagram of a prior art FM receiver;

FIG. 3A, 3B, 3C and 3D are timing charts illustrating the operation of the FM receiver of FIG. 2.

DESCRIPTION OF THE PREFERRED EMBODIMENTS

Figure 2:
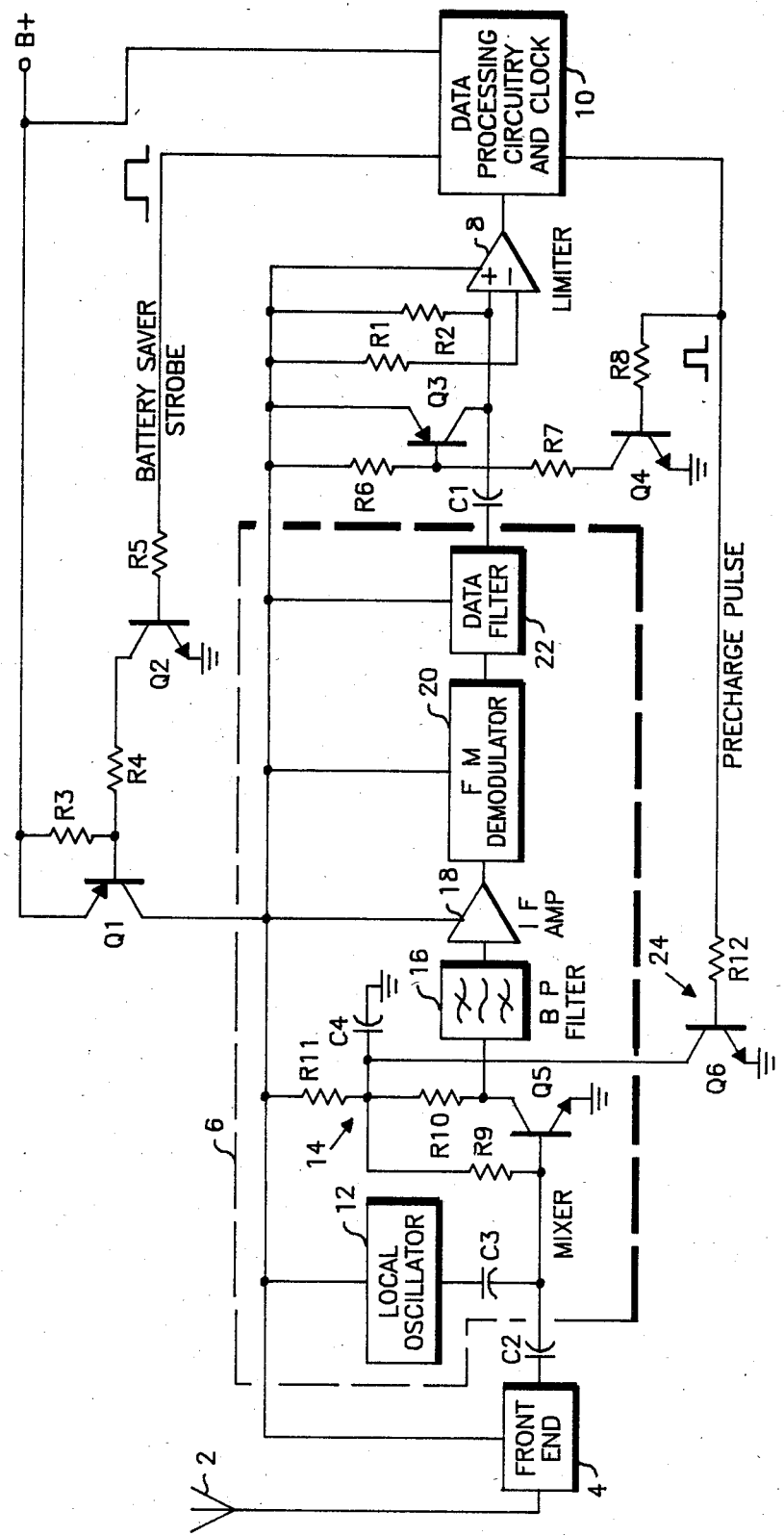
FIG. 2 is a circuit diagram of an FM receiver according to the present invention.

Referring now to the drawings, wherein like reference numerals designate identical or corresponding parts throughout the several views, and more particularly to FIG. 2 thereof, wherein an FM receiver including a reference voltage stabilization switching means is illustrated. Similar to FIG. 1, the receiver of FIG. 2 comprises an antenna 2 which directs received signals to the front end 4 of the FM receiver, a back end 6, coupled to the front end 4 through the capacitor C2, the backend 6 being comprised of a local oscillator 12, a second mixer 14 coupled to the local ocillator 12 through the capacitor C3 and being comprised of the transistors Q5 and associated resistors R9, R10 and R11 and capacitor C4, a bandpass filter 16, a second intermediate frequency amplifier 18, demodulator 20 and data buffer and filter 22. The output of the back end 6 is connected through the coupling capacitor C1 to the input of the data limiter 8 which is connected to the positive side of the capacitor C1. The voltage source B+ is connected to the various components of the receiver through the first switching means. Resistors R1 and R2 are used to bias the data limiter 8, while the second switching means is used to quickly establish the correct potential across the coupling capacitor during the receiver ON portion of the battery saver cycle as mentioned hereinbefore. The coupling capacitor C1 provides for DC isolation between the back end 6 and the limiter 8 as described more fully earlier. It should be noted that the desired voltage across the capacitor C1 is that voltage which is measured when unmodulated carrier frequency is being sent and received. However, especially in binary paging systems, unmodulated carrier frequency is seldom transmitted.

It should further be noted that in that preferred embodiment the first and second switching means are primarily comprised of transistors. The transistor Q1 has its base connected to the driving transistor Q2, its emitter connected to the supply voltage B+, and its collector connected to the various predetermined receiver sections. The transistor Q3 is a PNP transistor or placed in parallel with the data limiter bias resistor R1 and has its collector connected to the positive side of capacitor C1 and its emitter connected to the supply voltage B+ through the transistor Q1. The base of the transistor Q3 is connected to receive the precharge pulse from the transistor Q4 and data processing circuitry 10.

Still referring to FIG. 2, the reference voltage stabilization circuit comprises a transistor Q6 having its collector connected to the junction of resistors R9, R10, R11 and the capacitor C4, its emitter connected to ground and its base connected to one end of the resistor R12. The resistor R12 has its other end connected to the data processing circuitry 10.

In the preferred embodiment the Golay Sequential Code (GSC) is contemplated for transmitting a long preamble which precedes an address or a batch of addresses. The preamble transmitted in GSC code consists of a 23 bit word which is repeated 18 times as illustrated in FIG. 3A. The battery saver strobe ON to OFF sampling ratio is adjusted to guarantee that the receiver decoder will see at least one complete preamble word as illustrated in FIG. 3B.

Again referring to FIGS. 2 and 3, a description of the operation of the present invention will be presented. When the power is strobed ON by the data processing circuitry and clock 10 to the device, that is when the transistor Q1 is turned ON, the transistor Q3 is simultaneously turned ON in order to rapidly charge the capacitor C1. Concurrently with the turning ON of transistors Q1 and Q3, the reference voltage stabilization circuit 24 is turned ON as shown in FIG. 3D, thus disabling the second mixer 14 and preventing any of the received signal from passing through the back end 6. This enables the IF amplifier 18 to limit on its own noise and because the receiver is disabled ahead of the selective elements, the noise will be closely centered about the unmodulated carrier frequency. As a result, the offset voltage error during the coupling capacitor precharge cycle is minimized. After the precharge pulse is completed, the reference voltage stabilization circuit must be turned OFF which enables the second mixer 14 and allows the received signal to pass through the back end 6, capacitor C1 and data limiter 8 in order that the data may be properly decoded.

In more detail, the transistor Q6 of the reference voltage stabilization circuit 24 is turned ON during the precharge pulse which causes the second mixer 14 bias current to be shorted to ground. When the second mixer 14 bias current is shorted to ground, the second mixer transistor Q5 is turned OFF and the received signal is prevented from reaching the output of the back end 6 (FIG. 2), thus minimizing the reference voltage offset error normally caused by the presence of the received signal at the output of the back end 6.

It should also be noted that a reference voltage stabilization circuit 24 similar to that shown in FIG. 2 could also be used to disable the RF amplifier or the first mixer by removing the bias therefrom, thus minimizing the reference voltage offset error from the unmodulated carrier reference voltage.

In summary, a reference voltage stabilization circuit is used to disable a portion of the receiver circuitry ahead of the major selectivity elements during the precharge time of the coupling capacitor C1 in order to minmize offset voltage error during the precharge cycle.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Leters Patent of the United States is:

1. An RF receiver having a
receiver section, data processing circuitry, data limiting means connected to said data processing circuitry, a power source, and a coupling circuit means connected between said receiver section and said data limiting means, said coupling circuit means having a capacitor, comprising:
first periodically activated switching means, connected to said data processing circuitry, having an input connectable to said power source and an output connected to said receiver section, for supplying power to said receiver section when said first switching means is periodically activated;
second periodically activated switching means, having an input connectable to said power source and an output connected to said coupling circuit means, for charging said capacitor when said first switching means is periodically activated; and
reference voltage stabilization means, connected to said receiver section, for preventing a received signal from reaching said capacitor when said first switching means is periodically activated, whereby the output of said receiver section is stabilized at an unmodulated carrier reference voltage.

2. An RF receiver, according to claim 1, wherein:
said first switching means includes a first transistor connected to said data processing circuitry which is activated in response to a signal from said data processing circuitry.

3. An RF receiver, according to claim 1, wherein:
said reference voltage stabilization means includes a first transistor connected to said data processing circuitry which is activated in response to a signal from said data processing circuitry, whereby said received signal is prevented from reaching the input of said coupling circuit means; and
said second switching means includes a second transistor connected to said first transistor and said capacitor which is activated in synchronism with said first switching means and said reference voltage stabilization means.

4. An RF receiver, according to claim 1, wherein:
said second switching means includes a first transistor connected to said capacitor and a second transistor connected to said first transistor and said data processing circuitry which is activated in synchronism with said first switching means whereby said capacitor is charged; and
said reference voltage stabilization means includes a third transistor connected to said data processing circuitry which is activated in synchronism with said first switching means, whereby said received signal is prevented from reaching the input of said coupling means.

5. A circuit, for use with a receiver having a receiver section and a data limiter, said circuit including in combination:
means for coupling said receiver section to said data limiter;
a battery saver means for periodically supplying power, during a power ON time, to said receiver section;
means for precharging said coupling means during said power ON time to set a predetermined level for said coupling means; and
switch means for preventing said receiver from applying a received data signal to said coupling means during a portion of said power ON time.

* * * * *